(12) United States Patent
Moore

(10) Patent No.: US 8,521,671 B2
(45) Date of Patent: Aug. 27, 2013

(54) NEURAL NETWORK FOR CLUSTERING INPUT DATA BASED ON A GAUSSIAN MIXTURE MODEL

(75) Inventor: Douglas A. Moore, San Diego, CA (US)

(73) Assignee: The Intellisis Corporation, San Diego, CA (US)

(*) Notice: Subject to any disclaimer, the term of this patent is extended or adjusted under 35 U.S.C. 154(b) by 436 days.

(21) Appl. No.: 12/850,352

(22) Filed: Aug. 4, 2010

(65) Prior Publication Data

US 2011/0270788 A1    Nov. 3, 2011

Related U.S. Application Data

(60) Provisional application No. 61/329,919, filed on Apr. 30, 2010.

(51) Int. Cl.
*G06E 1/00* (2006.01)
*G06E 3/00* (2006.01)
*G06F 15/18* (2006.01)
*G06G 7/00* (2006.01)

(52) U.S. Cl.
USPC ........................................................... 706/20

(58) Field of Classification Search
USPC ........................................ 706/20, 16, 15, 62
See application file for complete search history.

(56) References Cited

U.S. PATENT DOCUMENTS

| | | | |
|---|---|---|---|
| 7,103,584 B2* | 9/2006 | Lee | 706/14 |
| 2002/0049704 A1* | 4/2002 | Vanderveldt et al. | 707/1 |
| 2004/0002776 A1* | 1/2004 | Bickford | 700/30 |
| 2007/0094168 A1* | 4/2007 | Ayala et al. | 706/15 |
| 2007/0100780 A1* | 5/2007 | Fleischer et al. | 706/15 |

OTHER PUBLICATIONS

Miyanaga et al, "Parallel and Adaptive Clustering Method Suitable for a VLSI System", IEEE International Sympoisum on Circuits and Systems, 1991, Date of Conference: Jun. 11-14, 1991, pp. 356-359, vol. 1.*
Ishii et al, "On-line EM algorithm and reconstruction of chaotic dynamics", ATR Human Information Processing Research Laboratories, 1998, IEEE.*
Xiang et al, "Efficient Text-Independent Speaker Verification with Structural Gaussian Mixture Models and Neural Network", IEEE Transactions on Speech and Audio Processing, vol. 11, No. 5, Sep. 2003.*
Tsuji et al, "A Recurrent Log-Linearized Gaussian Mixture Network", IEEE Transactions on Neural Networks, vol. 14, No. 2, Mar. 2003.*
Kramer et al, "Network inference—with confidence—from multivariate time series", arXiv:0903.2210v1 [q-bio.QM] Mar. 12, 2009.*
Matthieu et al, "Distributed Real Time Neural Networks in Interactive Complex Systems", CSTST Oct. 27-31, 2008.*

(Continued)

*Primary Examiner* — Jeffrey A Gaffin
*Assistant Examiner* — Ilya Traktovenko
(74) *Attorney, Agent, or Firm* — Pillsbury Winthrop Shaw Pittman LLP

(57) ABSTRACT

Disclosed are systems, apparatuses, and methods for clustering data. Such a method includes providing input data to each of a plurality of cluster microcircuits of a neural network, wherein each cluster microcircuit includes a mean neural group and a variance neural group. The method also includes determining a response of each cluster microcircuit with respect to the input data. The method further includes modulating the mean neural group and the variance neural group of each cluster microcircuit responsive to a value system.

20 Claims, 7 Drawing Sheets

(56) References Cited

OTHER PUBLICATIONS

Chinrungrueng et al, "Optimal Adaptive K-Means Algorithm with Dynamic Adjustment of Learning Rate", TR-9J-017, Department of Electrical Engineering and Computer Sciences University of California, Berkeley, Mar. 1991.*

A. L. Hodgkin and A. F. Huxley; "*A Quantitative Description of Membrane Current and its Applications to Conduction and Excitation in Nerve*"; J. Physiol. (1952), pp. 500-544.

Anil K. Seth et al; "*Visual Binding Through Reentrant Connectivity and Dynamic Synchronization in a Brain-Based Device*"; Oxford University Press 2004; Cerebral Cortex Nov. 2004; pp. 1185-1199.

Jeffrey L. Krichman and Gerald M. Edelman, "*Machine Psychology: Autonomous Behavior, Perceptual Categorization and Conditioning in a Brain-Based Device*" Oxford University Press 2002; Cerebral Cortex Aug. 2002; pp. 818-830.

Bruno A. Olshausen and David J. Field, "*How Close Are We to Understanding V1?*"; Neural Computation 17, pp. 1665-1699; (2005).

Bruno A. Olshausen and David J. Field, "*Sparse Coding with an Overcomplete Basis Set: A Strategy Employed by V1?*", pp. 3311-3325, vol. 37, No. 23, 1997.

Percy Liang and Dan Klein, "*Online EM for Unsupervised Models*" 9 pages, Computer Science Division, EECS Department, Berkeley, CA.

Jeffrey L. McKinstry et al., "*A Cerebellar Model for Predictive Motor Control Tested in a Brain-Based Device*", PNAS, pp. 3387-3392, vol. 103, No. 9, Feb. 28, 2006.

Eugene M. Izhikevich, "*Simple Model of Spiking Neurons*", IEEE Transactions on Neural Networks, vol. 14, No. 6, Nov. 2003.

Aapo Hyvärinen et al., "*Independent Component Analysis*," John Wiley & Sons, Inc., New York, NY, 2001 entire book.

\* cited by examiner

NEURAL NETWORK FOR CLUSTERING INPUT DATA BASED ON A GAUSSIAN MIXTURE MODEL

CROSS REFERENCE TO RELATED APPLICATIONS

This application claims benefit under 35 U.S.C. §119(e) to U.S. Provisional Application No. 61/329,919 to Moore, entitled "Neural Network for Clustering Input Data Based on a Gaussian Mixture Model," filed Apr. 30, 2010, the foregoing application is incorporated by reference herein in their entirety.

BACKGROUND OF THE INVENTION

1. Field of the Invention

The present invention is generally directed to neural networks. More particularly, the present invention is directed to computations performed by neural networks.

2. Background Art

Neural networks attempt to achieve autonomous behavior—i.e., learn—based on a network of simulated neurons that are connected in a manner suggestive of connections between real neurons in humans. In humans, a first neuron may fire in response to an external stimulus. In response to the firing of the first neuron, other neurons connected to the first neuron may also fire.

Similarly, a first simulated neuron in an input layer of a neural network can become active (e.g., fire) in response to stimulus to the neural network. One or more simulated neurons connected to the first simulated neuron may become active (e.g., fire) in response to the activity (e.g., firing) of the first neuron. Whether the activity of the first simulated neuron causes other simulated neurons to become active is dependent on at least two factors: (i) a weight associated with a connection between the first simulated neuron and each other simulated neuron to which the first simulated neuron is connected; and (ii) the threshold activity level required to cause each other simulated neuron to become active.

Rather than using neural networks, a conventional method for learning from input data is to cluster the input data. For example, input speech data may be clustered according to the people who uttered the speech—such that the speech of a first person is organized into a first cluster, the speech of a second person is organized into a second cluster, and so on. Conventional clustering methods are typically configured as software algorithms that runs on a general-purpose computer. Unfortunately, a problem with conventional clustering algorithms is that the output (or result) of these clustering algorithms is dependent on both the initial configuration of the conventional clustering algorithms and the order in which data is presented to the conventional clustering algorithms.

What is desired, therefore, is a neural network that can cluster a sequence of input data.

BRIEF SUMMARY OF EMBODIMENTS OF THE INVENTION

The present invention meets the above-described needs by providing system, apparatus, articles of manufacture, and method embodiments for implementing a neural network that clusters input data based on a Gaussian Mixture Model.

For example, an embodiment of the present invention provides a method for clustering a stream of input data. This method includes providing input data to each of a plurality of cluster microcircuits of a neural network, wherein each cluster microcircuit includes a mean neural group and a variance neural group. The method also includes determining a response of each cluster microcircuit with respect to the input data. The method further includes modulating the mean neural group and the variance neural group of each cluster microcircuit responsive to a value system.

Another embodiment of the present invention provides a computer-program product for implementing the above-recited method.

A further embodiment of the present invention provides a computing system for implementing a neural network. The neural network includes an input group configured to receive input data and a plurality of cluster microcircuits coupled to the input neural group. Each cluster microcircuit includes a mean neural group, a variance neural group, one or more response-determining neural groups, and a value neural group. The one or more response-determining neural groups are configured to determine a response of each cluster microcircuit with respect to the input data. The value neural group is configured to modulate the mean neural group and the variance neural group of each cluster microcircuit responsive to a value system.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
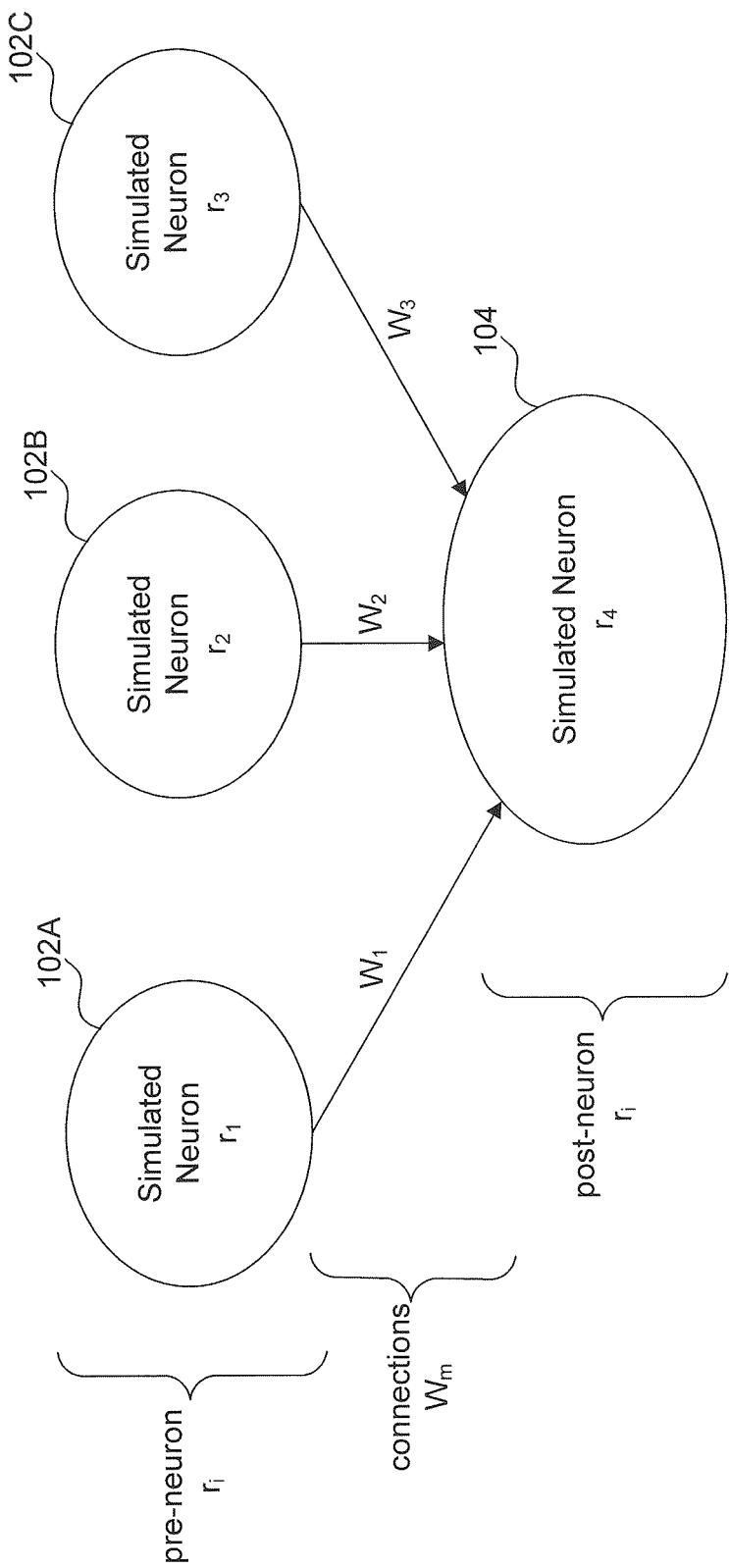
FIG. 1 illustrates an example neural anatomy in which three pre-neurons are connected to one post-neuron.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Overview of Embodiments of the Invention

Embodiments of the present invention are directed to neural networks for clustering input data based on a Gaussian Mixture Model and applications thereof. As used herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Further, it would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, and within the scope and spirit of the present invention.

An embodiment of the present invention provides a neural-network implementation of a Gaussian-Mixture-Model clustering algorithm. For a given data input signal containing n elements, there is a mean neural group and a variance neural group, wherein means and variances are learned through data presentation.

Before providing additional details of neural networks in accordance with embodiments of the present invention, it is first helpful to disclose concepts underlying neural networks.

II. Neural Networks

A. Basic Concepts of Neural Networks

A neural network comprises a set of discrete elements—neurons—that are connected to one another. Each neuron is typically connected to a fraction of all the neurons in the network. Associated with each neuron and connection is a set of states and parameters which are potentially changing with time.

FIG. 1 illustrates a very simple example of a neural network. In the example of FIG. 1, three neurons 102A-C (referred to as pre-neurons) are connected to one neuron 104 (referred to as a post-neuron). Mathematically, the set of states and parameters for each pre-neuron 102 and post-neuron 104 is described by a vector, $\vec{r}_j$, where the subscript identifies the particular neuron. For the example of FIG. 1, the index j runs from 1 to 4 because there are four neurons—i.e., three pre-neurons 102 and one post-neuron 104.

Similarly, each connection is described by a vector $\vec{w}_k$, where the subscript k identifies the connection. For the example of FIG. 1, the index k runs from 1 to 3 because there are three distinct connections—i.e., one connection from pre-neuron 102A to post-neuron 104, one connection from pre-neuron 102B to post-neuron 104, and one connection from pre-neuron 102C to post-neuron 104. In a neural network, each connection is directed. This means, for each connection, one neuron is designated as the start of the connection and the other neuron is the terminal for the connection. The start neuron for a given connection is called a pre-synaptic neuron (or pre-neuron) and the terminal for a given connection is called the post-synaptic neuron (or post-neuron).

III. Example System for Neural Simulation

A. Example Computer System and Software Implementation

Figure 2:
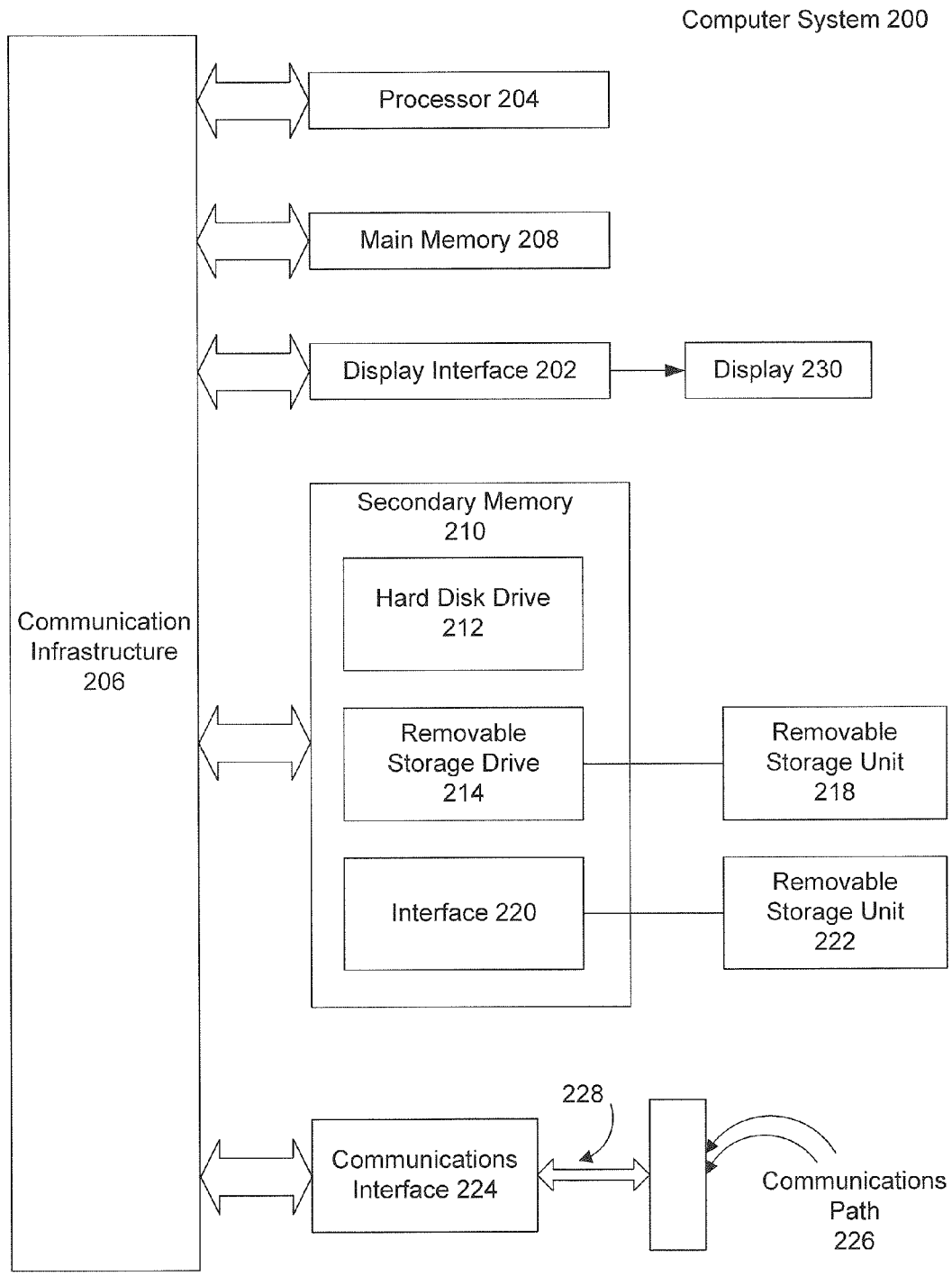
FIG. 2 illustrates an example computer system in accordance with an embodiment of the present invention.

Various aspects of the present invention—such as a neural network for clustering input data based on a Gaussian Mixture Model—can be implemented by software, firmware, hardware, or a combination thereof. FIG. 2 illustrates an example computer system 200 in which an embodiment of the present invention, or portions thereof, can be implemented as computer-readable code. Various embodiments of the invention are described in terms of this example computer system 200. After reading this description, it will become apparent to a person skilled in the relevant art how to implement the invention using other computer systems and/or computer architectures.

Computer system 200 includes one or more processors, such as processor 204. Processor 204 can be a special-purpose or a general-purpose processor. Processor 204 is connected to a communication infrastructure 206 (for example, a bus or network).

Computer system 200 includes a display interface 202. Display interface 202 is coupled to a display device 230 (such as, a liquid-crystal display, a cathode-ray tube display, a plasma screen display, or some other type of display).

Computer system 200 also includes a main memory 208, preferably random access memory (RAM), and may also include a secondary memory 210. Secondary memory 210 may include, for example, a hard disk drive 212 and/or a removable storage drive 214. Removable storage drive 214 may comprise a floppy disk drive, a magnetic tape drive, an optical disk drive, a flash memory, or the like. The removable storage drive 214 reads from and/or writes to a removable storage unit 218 in a well known manner. Removable storage unit 218 may comprise a floppy disk, magnetic tape, optical disk, etc. which is read by and written to by removable storage drive 214. As will be appreciated by persons skilled in the relevant art(s), removable storage unit 218 includes a computer-readable storage medium having stored therein computer software and/or data.

In alternative implementations, secondary memory 210 may include other similar means for allowing computer programs or other instructions to be loaded into computer system 200. Such means may include, for example, a removable storage unit 222 and an interface 220. Examples of such means may include a program cartridge and cartridge interface (such as that found in video-game devices), a removable memory chip (such as an EPROM, or PROM) and associated socket, and other removable storage units 222 and interfaces 220 which allow software and data to be transferred from the removable storage unit 222 to computer system 200.

Computer system 200 may also include a communications interface 224. Communications interface 224 allows software and data to be transferred between computer system 200 and external devices. Communications interface 224 may include a modem, a network interface (e.g., an Ethernet card), a communications port, a PCMCIA slot and card, or the like.

Software and data transferred via communications interface 224 are in the form of signals 228 which may be electronic, electromagnetic, optical, or other signals capable of being received by communications interface 224. These signals 228 are provided to communications interface 224 via a communications path 226. Communications path 226 carries signals 228 and may be implemented using wire or cable, fiber optics, a phone line, a cellular phone link, an RF link or other communications channels.

In this document, the terms "computer program medium" and "computer-readable storage medium" are used to generally refer to media or other articles of manufacture such as removable storage unit 218, removable storage unit 222, and a hard disk installed in hard disk drive 212. Computer-program medium and computer-readable storage medium can also refer to memories, such as main memory 208 and secondary memory 210, which can be memory semiconductors (e.g., DRAMs, etc.). These computer-program products are means for providing software to computer system 200.

Computer programs (also called computer control logic) are stored in main memory 208 and/or secondary memory 210. Computer programs may also be received via communications interface 224. Such computer programs, when executed, enable computer system 200 to implement embodiments of the present invention as discussed herein, such as neural simulations as described above. Accordingly, such computer programs represent controllers of the computer system 200. Where embodiments of the invention are implemented using software, the software may be stored in a computer program product and loaded into computer system 200 using removable storage drive 214, interface 220, hard drive 212 or communications interface 224.

B. Configuration of Computer System for Neural Simulations

Figure 3:
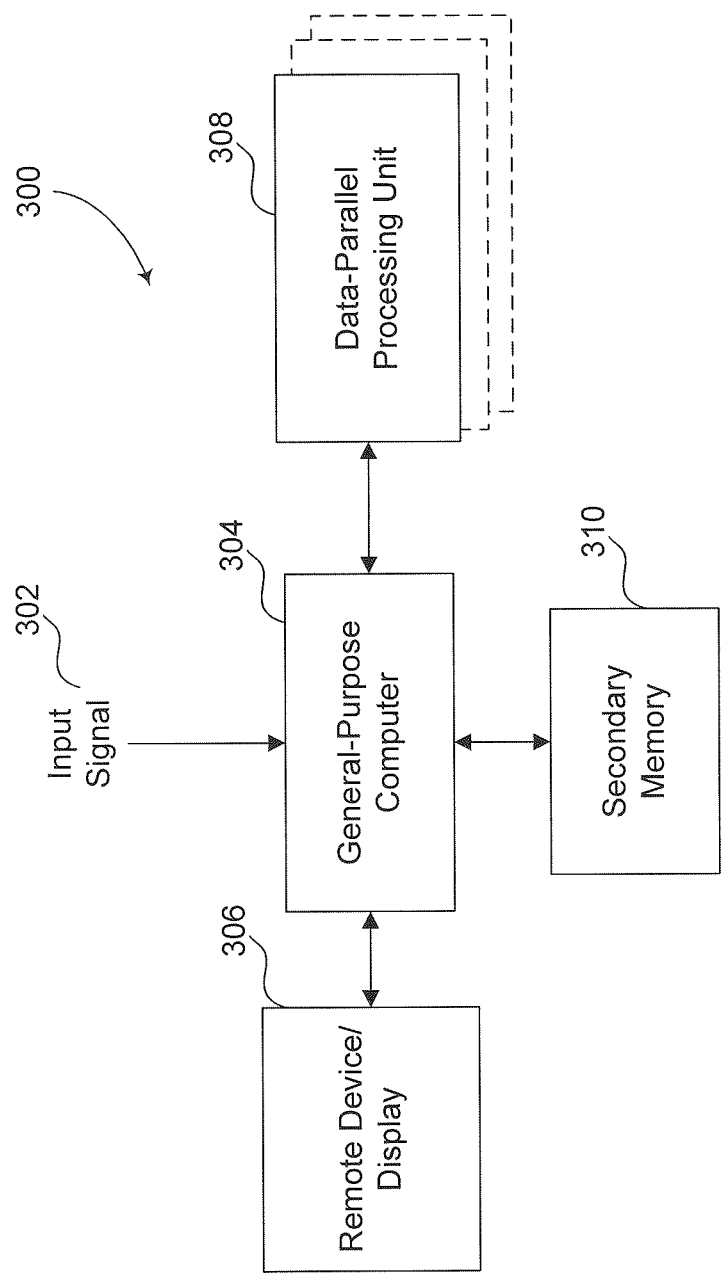
FIG. 3 illustrates a more-detailed example computer system for implementing a neural simulation in accordance with an embodiment of the present invention.

FIG. 3 illustrates an example system 300 for implementing a neural simulation in accordance with an embodiment of the present invention. Referring to FIG. 3, system 300 includes a general-purpose computer 304, a remote device (display) 306, a secondary memory 310, and a data-parallel processing unit 308.

General-purpose computer 304 performs input/output functions of system 300. To perform these functions, general-purpose computer 304 comprises typical components of a general-purpose computer—such as, for example, a memory and general-purpose processor. General-purpose computer 304 is coupled to remote device (display) 306, data-parallel processing unit 308, and secondary memory 310. An input signal 302 (e.g., a video signal, audio signal, or some other input signal) is provided to general-purpose computer 304.

Remote device (display) 306 enables an administrator to interact with system 300. Remote device 306 may simply comprise a monitor and keyboard to enable a user to interact with general-purpose computer 304. Alternatively, remote device 306 may comprise a computing device (e.g., laptop computer, desktop computer, hand-held device, or the like) that is coupled to general-purpose computer 304 via a network connection (e.g., a local area network (LAN) connection, an Internet connection, or the like). Remote device 306 may be used by an administrator to set up a neural simulation. For example, the administrator may provide a network-description file or other inputs as described in more detail below. Additionally, remote device 306 enables an administrator to monitor the progress of a neural simulation that may run on system 300. For example, if input signal 302 is a video signal, general-purpose computer 304 may cause input signal 302 to be displayed on remote device 306 to enable an administrator to evaluate whether system 300 is properly functioning to identify entities (e.g., objects) included in the video signal. As another example, if input signal 302 is an audio signal, general-purpose computer 304 may cause input signal 302 to be played on remote device 306 to enable an administrator to evaluate whether system 300 is properly functioning to identify entities (e.g., sound sources) included in audio signal.

Secondary memory 310 stores algorithms (e.g., neural simulations) to be executed by system 300 and also stores instances of simulated neural (which may be stored as memory arrays). Secondary memory 310 may comprise, for example, a hard disk drive or a removable storage drive (e.g., floppy disk drive, magnetic tape drive, an optical disk drive, a flash drive, etc.).

Data-parallel processing unit 308 performs computations to implement a neural simulation in accordance with an embodiment of the present invention. In an embodiment, data-parallel processing unit 308 comprises one or more off-the-shelf graphics processing units (GPUs)—such as but not limited to, for example, three general-purpose GPUs provided by NVIDIA Corporation of Santa Clara, Calif. ("NVIDIA"). In another embodiment, data-parallel processing unit 308 comprises one or more custom-made processing units, in an embodiment specifically configured to process neural-simulation data.

Data-parallel processing unit 308 is connected to general-purpose computer 304. The connection between data-parallel processing unit 308 and general-purpose computer 304 may comprise a peripheral component interconnect (PCI), a PCI express (PCIe), or some other type of connection. Data-parallel processing unit 308 communicates with general-purpose computer 304 via an application-programming interface (API). The API allows an administrator to program data-parallel processing unit 308 to perform functions of a neural simulation in accordance with an embodiment of the present invention. If data-parallel processing unit 308 comprises a custom-made processing unit, then a custom-made API is used. If, on the other hand, data-parallel processing unit 308 comprises one or more off-the-shelf GPUs, then either a custom-made or commercially available API can be used. Several types of commercially available APIs for programming off-the-shelf GPUs currently exist—including but not limited to, for example, DirectX® developed by Microsoft Corporation of Redmond, Wash.; OpenGL® developed by Silicon Graphics, Inc. of Sunnyvale, Calif.; and Compute Unified Device Architecture (CUDA) developed by NVIDIA. For commercially available APIs, the API typically communicates with a driver. The driver translates standard code received from the API into a native format of instructions understood by the off-the-shelf GPU. The driver is typically written by the manufacturer of the off-the-shelf GPU. The GPU then executes the instructions from the driver.

IV. Example Operation of Neural Simulation

Figure 4:
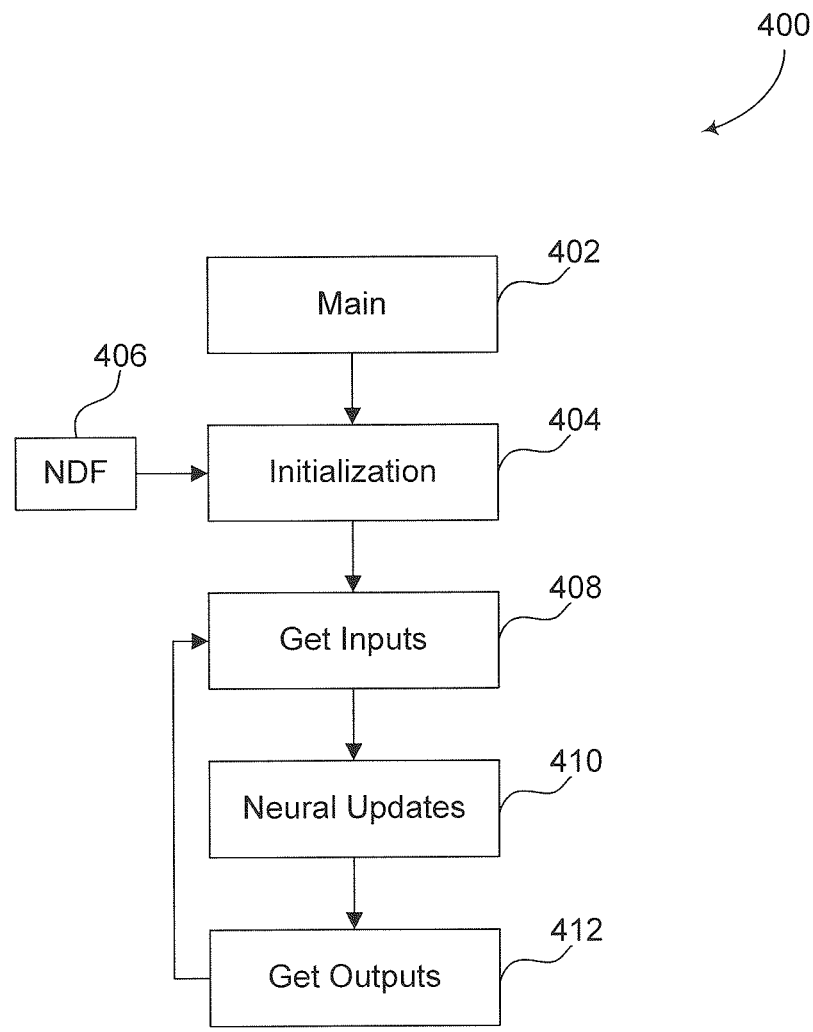
FIG. 4 illustrates an example process for implementing a neural simulation in accordance with an embodiment of the present invention.

FIG. 4 illustrates steps of an example neural simulation 400 performed by a neural network in accordance with an embodiment of the present invention. Neural simulation 400 may be implemented, for example, on the hardware components of system 300 of FIG. 3 as explained in greater detail below.

Referring to FIG. 4, neural simulation 400 begins at a step 402 in which a main function is called. The algorithm used to implement neural simulation 400 may be stored, for example, in secondary memory 310 of system 300. Calling the main function, as illustrated in step 402, may load this algorithm (or a portion thereof) into the local memory of general-purpose computer 304 in preparation for the execution of neural simulation 400.

In a step 404, neural simulation 400 is initialized based on groups and projections defined in a network-description file 406. A group defines a collection of simulated neurons. A projection defines how simulated neurons are to be connected.

Network-description file 406 specifies features of each group of simulated neurons. These features are implemented during the initialization of step 406. As would be understood by persons skilled in the art, the features specified by network-description file 406 may include, but are not limited to, the following:

- Height—the number of simulated neurons included in the neural group along a first (e.g., vertical) dimension;
- Width—the number of simulated neurons included in the neural group along a second (e.g., horizontal) dimension;
- Firing threshold—an overall activity level that must be received by a simulated neuron in order to cause the simulated neuron to become active;
- Phase threshold—an activity level that must be received by a simulated neuron in order to cause the simulated neuron to choose a phase; otherwise, the phase is set randomly;
- Voltage-dependent threshold—an activity level that must be collectively provided by all voltage-independent inputs to a simulated neuron in order for voltage-dependent inputs to contribute to the activity of the simulated neuron; and
- Persistence—a duration over which a simulated neuron remains active.

It is to be appreciated that these features are presented for illustrative purpose only, and not limitation. Other features of a neural group may be specified in network-description file 406.

In addition to neural groups, network-description file 406 specifies projections between neural groups. The projections define how the simulated neurons of the different neural groups will connect to each other during the initialization of step 404. As would be understood by persons skilled in the art, network-description file 406 may specify, for example, the following features of each projection:

- from neural group—the simulated group of neurons from which a connection emanates;
- to neural group—the simulated group of neurons to which a connection is made;
- probability—the probability that a connection will be created between a from neuron and a to neuron during initialization;
- influence—a weighting factor for a particular connection;
- maximum initial weight—the maximum initial weight between a from neuron and a to neuron;
- minimum initial weight—the minimum initial weight between a from neuron to a to neuron;
- connection type—the type of connection (e.g., voltage-dependent or voltage-independent) between a from neuron and a to neuron;
- phase-dependent—the phase-dependency of a connection (e.g., phase-independent or phase-dependent)
- learning rule—the transfer function between a from neuron and a to neuron; and
- learning rate—a parameter that governs how quickly a connection strength between a from neuron and a to neuron can change over time.

It is to be appreciated, however, that the features of neural projections presented above are presented for illustrative purposes only, and not limitation. Other features of neural projections may be included in network-description file 406.

Referring again to FIG. 4, after the initialization step 404 is performed, inputs to simulation 400 are obtained, as illustrated in a step 408. The inputs refer to the activity and phase of each simulated neuron used in a neural simulation. Initially, the activity and phase of simulated neurons is set based on an input signal. In an embodiment, the I/O functions required to get the inputs of step 408 are performed by general-purpose computer 304. For example, get-inputs step 408 may be performed by general-purpose computer 304 when it receives an input signal and provides the input signal to data-parallel processing unit 308.

In a step 410, neural updates are computed. That is, a new activity and phase are computed for each simulated neuron. The new activity and phase of a first simulated neuron is based on the activities and phases of other simulated neurons connected to the first simulated neuron. An example method for updating the activity and phase of a simulated neuron is presented in U.S. application Ser. No. 12/621,243 to Moore et al., entitled "Neural Segmentation of an Input Signal and Applications Thereof, filed Nov. 18, 2009, the entirety of which is hereby incorporated by reference herein. In an embodiment, the neural updates of step 410 are computed by data-parallel processing unit 308.

In a step 412, results of the neural updates are obtained. For example, general-purpose computer 304 may obtain the results of the neural updates performed by data-parallel processing unit 308 during step 410.

After step 412, neural simulation 400 may loop back to step 408. In an embodiment, steps 408, 410, and 412 represent one simulation cycle of neural simulation 400.

V. Neural Network for Clustering Input Data based on a Gaussian Mixture Model As set forth above, an embodiment of the present invention provides a neural network for clustering input data based on a Gaussian Mixture Model. In general, clustering is a way to process large volumes of input data. For example, clustering organizes a set of objects into groups that are similar to each other. There are several well-known algorithms for clustering data, including the k-means algorithm and the Gaussian Mixture Model. Disclosed below is (A) an overview of Gaussian Mixture Models and (B) an example neural network for clustering input data based on a Gaussian Mixture Model in accordance with an embodiment of the present invention.

A. Overview of Gaussian Mixture Models

A Gaussian Mixture Model ("GMM") is a more powerful version of the well-known k-means algorithm. The k-means algorithm is a method for partitioning n observations (or input data) into k clusters, wherein n and k are integers. (See, e.g., Aapo Hyvarinen, Juha Karhunen, and Erkki Oja, "Independent Component Analysis," John Wiley & Sons, Inc., New York, N.Y., 2001, the entirety of which is incorporated by reference herein.) As a simple, non-limiting example, the k-means algorithm may be used to partition the measured heights of 100 individuals into 10 clusters.

The GMM is more powerful than the k-means algorithm in two important ways. First, for each data point, a relative probability is assigned that each data point came from each cluster. This soft assignment of each data point contrasts with the hard assignment that occurs in the k-means algorithm. The relative probability depends on the distance of the data point from each cluster. Second, instead of weighting the distance equally in all directions, the GMM uses a covariance matrix to re-weight the distance in different directions. This means that the contours of equal probability are ellipses, instead of circles as in the k-means algorithm.

A GMM can be fit to a dataset using an algorithm known as the Expectation Maximization (EM) algorithm. The original version of the EM algorithm was an iterative algorithm that used the entire dataset on each iteration. More recently, online versions have been developed that process a single data point at each iteration. See Percy Liang and Dan Klein, "Online EM for Unsupervised Models," In NAACL '09: *Proceedings of Human Language Technologies: The* 2009 *Annual Conference of the North American Chapter of the Association of Computational Linguistics*, Morristown, N.J., pp. 611-619, 2009, the entirety of which is hereby incorporated by reference herein.

As with the k-means algorithm, fitting a GMM using the EM algorithm entails two alternating steps, referred to as an expectation step ("E-step") and a maximization step ("M-step"). The E-step computes the relative probability that each data point came from each cluster. The M-step updates the parameters of each cluster using the weights assigned by the E-step.

The equations for the online E-step are $$s^k = p(k|x)$$

and $$s^k = \frac{\alpha^k p(x|\vec{\mu}^k, C^k)}{\sum_l \alpha^l p(x|\vec{\mu}^l, C^l)}$$

Here $\vec{x}$ is the most recent data point; $\alpha^k$ is the prior probability of cluster k; $p(x|\vec{\mu}^k, C^k)$ is the likelihood of the data $\vec{x}$ under a Gaussian distribution with mean $\vec{\mu}^k$ and covariance matrix $C^k$. The prior probability $p(x|\vec{\mu}^k, C^k)$ can be written as $$p(x|\vec{\mu}^k, C^k) = \frac{1}{(2\pi)^{D_x/2}|C^k|^{1/2}} \exp\left(\frac{-1}{2}(\vec{x}-\vec{\mu}^k)^T (C^k)^{-1} (\vec{x}-\vec{\mu}^k)\right)$$

The M-step is governed by the equations $$\alpha^k \leftarrow (1-\eta)\alpha^k + \eta s^k$$

$$\vec{\mu}^k \leftarrow (1-\eta^k s^k)\vec{\mu}^k + \eta s^k \vec{x}$$

$$C^k \leftarrow (1-\eta^k s^k)C^k + \eta s^k (\vec{x}-\vec{\mu}^k)^T$$

Here $\eta$ measures the learning rate which controls how much the most recent data point, $\vec{x}$, influences the parameters ($\alpha^k$, $\vec{\mu}^k$, $C^k$). Typically $\eta$ decreases with the number of data points. One possible function for $\eta$ is $$\eta = \frac{1}{(t+t_{start})^\beta}$$

wherein $t_{start}$ and $\beta$ are parameters that control how $\eta$ changes with time. $\beta$ is typically between 0.5 and 1. Furthermore, sometimes $\eta$ is different for each cluster.

Figure 5A:
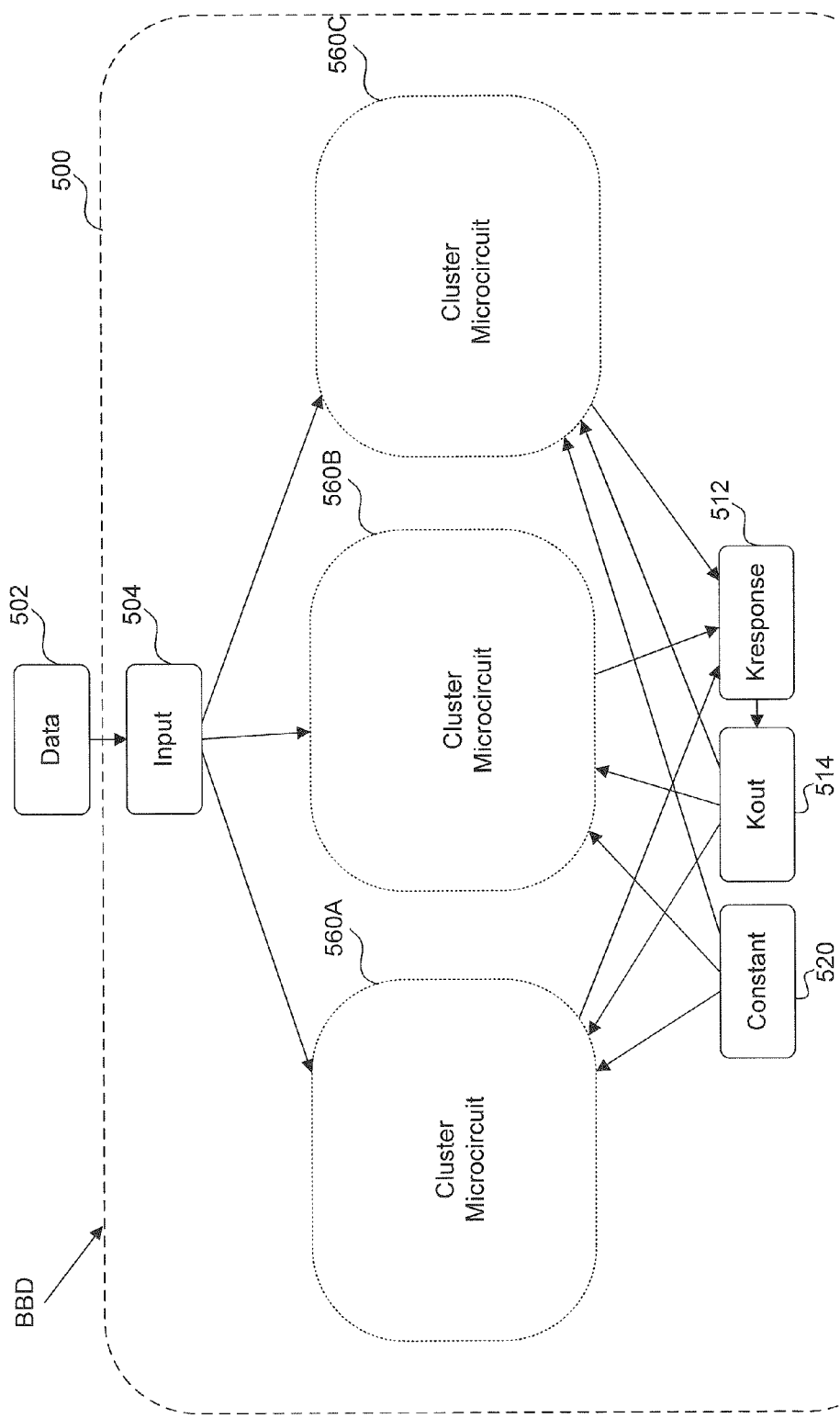
FIG. 5A illustrates an example neural network, including a plurality of cluster microcircuits, for clustering input data based on a Gaussian Mixture Model in accordance with an embodiment of the present invention.
Figure 5B:
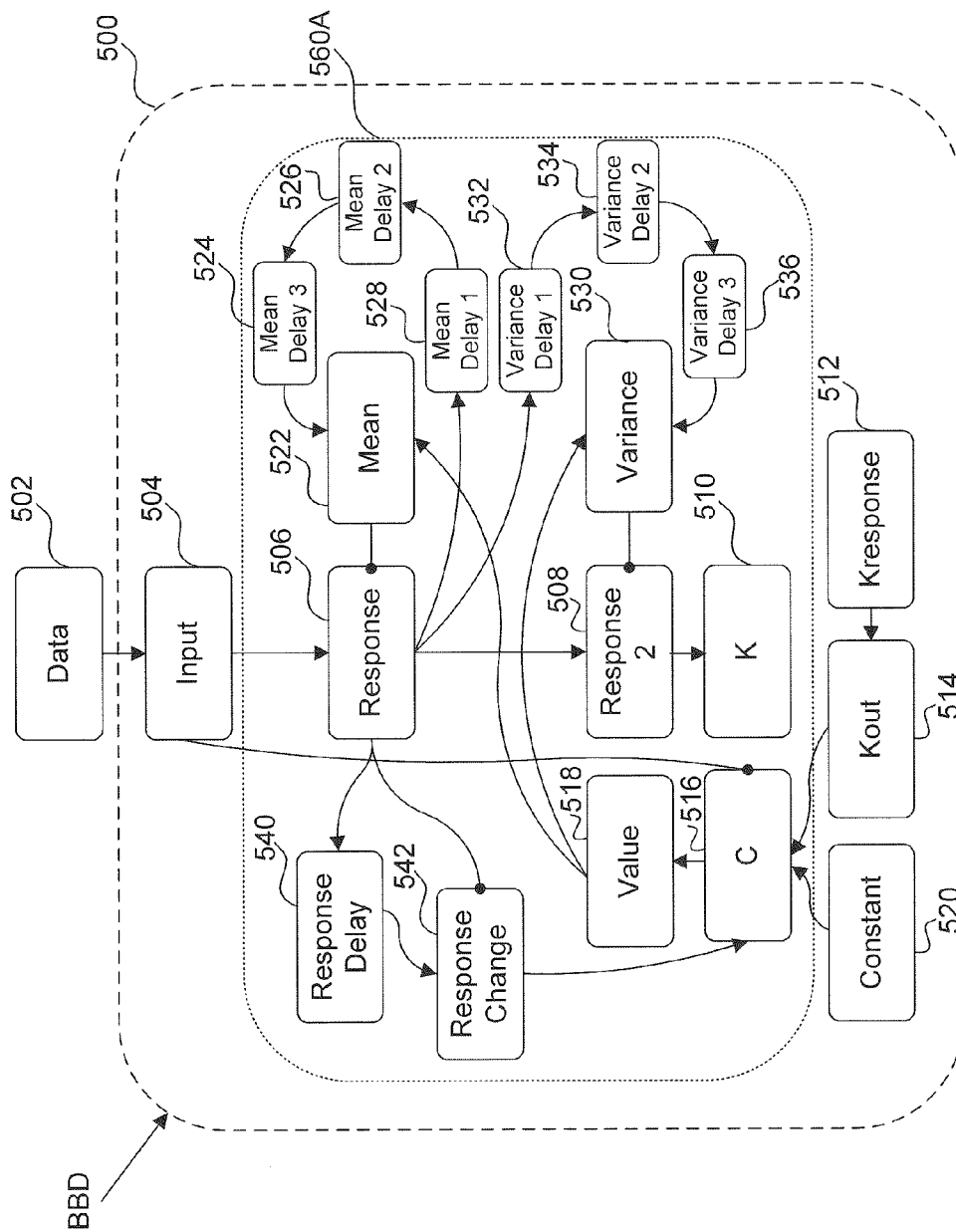
FIG. 5B illustrates example details of a cluster microcircuit of FIG. 5A.

B. Example Neural Network for Clustering Input Data Based on a Gaussian Mixture Model FIGS. 5A and 5B illustrate an example brain-based device (BBD) 500 for clustering input data based on a GMM in accordance with an embodiment of the present invention. Unlike a conventional clustering algorithm (e.g., a GMM) that runs on general-purpose microprocessors, clustering in accordance with an embodiment of the present invention is performed on BBD 500, which is advantageous for at least two reasons. First, BBD 500 includes a value system that can guide the clustering (i.e., learning) in a desired direction, as described below. For example, if the BBD 500 is used to process a stream of input audio data, the value system can push the BBD 500 to learn when a particular speaker (e.g., John) is talking or when a particular language (e.g., Chinese) is spoken. Second, BBD 500 implements clustering on a neural-network platform, thereby serving to streamline processing since the clustering does not need to be outsourced to a general-purpose processing unit as with conventional clustering algorithms. For example, to analyze a stream of input audio data, it may be desirable to use a noise filter to filter out noise and to use a cluster algorithm to identify when a particular language (e.g., Chinese) is spoken. In accordance with an embodiment of the present invention, the noise filter and the cluster algorithm can both be implemented in a single BBD, thereby streamlining the processing.

Referring to FIG. 5A, BBD 500 includes three cluster microcircuits 560A,B,C and a plurality of neural groups—including an input 504, a k-response 512, a k-out 514, a constant 520. The number of neurons in each group is dependent on the data that is presented, as would be understood by a person skilled in the art.

For illustrative purposes only, and not limitation, FIG. 5B illustrates neural groups included in just one of the three cluster microcircuits, namely cluster microcircuit 560A. Referring to FIG. 5B, cluster microcircuit 560A includes a response 506, a second response 508, a k-group 510, a control group 516, a value group 518, a mean 522, a first mean delay 528, a second mean delay 526, a third mean delay 524, a variance 530, a first variance delay 532, a second variance delay 534, a third variance delay 536, a response delay 540, and a response change 542.

In BBD 500, each connecting line represents a projection from one neural group to another. Lines ending with an arrow are excitatory (+) projections, and lines ending with a circle are inhibitory (−) connections.

As set forth above, in a standard GMM model, there are k clusters with a learned center or mean and a covariance matrix. Box 560 of BBD 500 represents one such cluster—wherein (i) mean 522 encodes the center of the cluster, (ii) variance 530 encodes the variance of the cluster, and (iii) k-group 510 represents the weighted response of the neural network with respect to the cluster. The combined response of all the clusters—e.g., clusters 560A, 560B, and 560C of FIG. 5A—is encoded in k-response 512 and the calculated control signal is encoded in k-out 514.

The projections from value group 518 to mean 522 and variance 530 represent a value system modulation, wherein the mean 522 and variance 532 are modulated by value group 518. A value system modulation helps BBD 500 to learn a desired feature. For example, for a BBD configured to analyze a stream of input speech, a value system modulation may be configured to cause the BBD to learn when a Chinese-language speaker is talking. A value system may be internal to or external from a BBD. An example of an internal value system is the neural activity of a specified neural group. An example of an external value system is an external input signal that is provided to a BBD. In the example of FIG. 5B, the value system is internal. In particular, the value group 518 controls the neural persistence of each of the mean 522 and variance 532. By controlling the neural persistence, the value group 518 effects the rate at which the mean 522 and variance 532 change, as explained in greater detail below.

The information processing properties of neurons, in a much simplified form, can be summarized by the following input-output relations, for K-dimension space:

$$\text{act} = \sigma\left(\sum_{i=0}^{K-1} w_i x_i\right) = \sigma(w^T \cdot x)$$

where $x_i$ and $w_i$ are the input and synaptic weight from the i-th incoming synaptic cell, respectively, act is the cell output, and σ(x) is an (optional) output modifying function, usually a non linear sigmoid function.

Each neuron is given a persistence value which determines the percentage contribution of new input related to previous input.

learningAdjust=(1−learningRate)+
learningrate*valueActivity          (Eq.1)

persistence=persistence*learningAdjust          (Eq.2)

$\text{act}_{new}$=$\text{act}_{old}$*(persistence)+act*(1.0−persistence)          (Eq.3)

For the learning groups mean 522 and variance 530, persistence is set to 1.0 and prevents any change in the activity of the neurons aside from the value system. An exemplary learning rate may be 0.0001. A high value activity prevents learning. In this way, the activity of the value group 518 is used to modulate the learning of mean neural group 522 and the variance neural group 530

Figure 6:
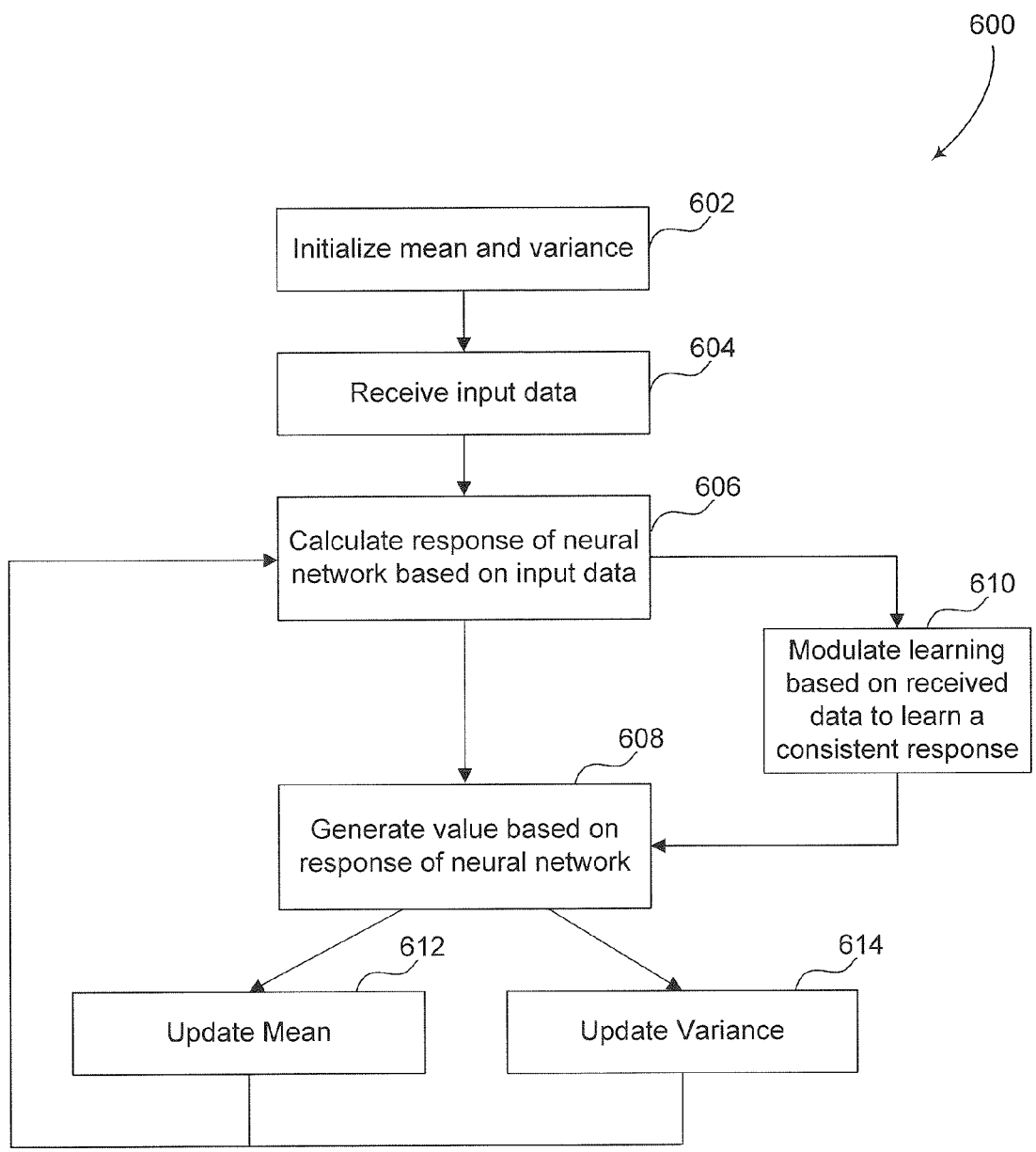
FIG. 6 illustrates an example method for implementing a Gaussian Mixture Model using the example neural network of FIG. 5.

FIG. 6 illustrates an example method 600 for implementing a Gaussian Mixture Model using the example BBD 500 of FIG. 5. Referring to FIG. 6, method 600 begins at a step 602 in which mean 522 and variance 530 are initialized. For example, initializing the mean 522 may entail setting the mean 522 to an expected value, and initializing the variance 530 may entail setting the variance 530 to zero. BBD 500 is generated with a predetermined number of cluster microcircuits 560 with randomly initialized mean values and (substantially) zero variance. In the example of FIG. 5A, BBD 500 is illustrated as including three cluster microcircuits, but a BBD in accordance with an embodiment of the present invention may generally include any whole number of cluster microcircuits (e.g., k number of microcircuits). After initializing the mean and variance, the loop for processing data and learning is entered.

In a step 604, input data 502 is received. For example, input signal 502 may comprise, but is not limited to, a video signal, an audio signal, a radar signal, a sonar signal, stock-market data, email text, data regarding credit-card use, and/or other types of input signals. As illustrated in FIG. 5, the input data 502 is sent to input group 504.

In a step 606, the response of cluster 560 is calculated based on input data 502.

To calculate the response, the current input 504 positively projects to individual cluster response groups—such as, response 506 of cluster microcircuit 560A, illustrated in FIG. 5B. Current individual mean groups—such as, mean 522 of cluster microcircuit 560A—negatively project to corresponding response groups with equal weight. This results in calculating a difference from a mean of this cluster center along each input dimension. Response 506 projects to second response 508 with squared projection to eliminate negative values, and variance 530 projects negatively to second response 508 in order to reduce the overall effect of dimensions with large experienced variance. Second response 508 projects to k-group 510, which is one neuron as a sum of the difference in all the dimensions with variance 530 reducing the effect of dimensions with known large variance.

In a step 608, the value 518 is generated based on the response of each cluster microcircuit, such as cluster microcircuits 560A, 560B, and 560C. Specifically, k-response 510 for each of the cluster microcircuits 560 is placed into k-response 512 to have one group containing all the responses for all the clusters. K-out 514 is an index of neurons calculated from k-response 512, wherein the respective neurons of k-out 514 project to the respective cluster microcircuits 560. As explained below, the index of neurons in k-out 514 determines which cluster microcircuits will learn from the input signal. K-out 514 projects to the c-group 516 of each of the cluster microcircuits, such as cluster microcircuit 560. C-group 516 projects to value 518, which is used to control learning for mean 522 and variance 530. After generating value 518 for each cluster 560, BBD 500 computes both a mean delay loop and a variance delay loop, as set forth below. The reason for the delay loops is to allow the calculation for the k-min response and the subsequent value adjustment for the learning.

In an embodiment, k-out 514 includes an index of neurons, including one neuron that is a 0 and all other neurons are 1s. In this embodiment, the 0 is projected to only one cluster microcircuit. For example, k-out 514 may project a 0 to only cluster microcircuit 560A and may project a 1 to each of cluster microcircuits 560B and 560C. In this way, the cluster microcircuit having a mean closest to the input signal (e.g., cluster microcircuit 560A in the example above) is the only cluster microcircuit that will have its mean and variance updated by the input signal because, as set forth above in Equations 1-3, a high activity for the value group 518 prevents learning. That is, the cluster microcircuit having a mean closest to the input signal is the only cluster microcircuit that learns from the input signal; all other microcircuits will not respond to this input signal.

In another embodiment, the minimum neuron is set to zero and other neurons are set to a number between 0 and 1 based on k-response 512. For example, k-out 514 may project a 0 to only cluster microcircuit 560A and may project a number between 0 and 1 to each of cluster microcircuits 560B and 560C. In this way, cluster microcircuits 560B and 560C may still learn from the input signal, wherein the value of the number projected to cluster microcircuits 560B and 560C effects the strength of their respective responses. That is, a number closer to 0 will cause the cluster microcircuits 560B and 560C to have a stronger response to (i.e., learn more from) the input signal. Conversely, a number closer to 1 will cause the cluster microcircuits 560B and 560C to have a weaker response to (i.e., learn less from) the input signal.

Returning to FIG. 6, in a step 612, the mean 522 is updated. To update the mean 522, the mean delay loop projects from response 506 to first mean delay 528, from first mean delay 528 to second mean delay 526, from second mean delay 526 to third mean delay 524, and finally from third mean delay 524 to mean 522.

In a step 614, the variance 530 is updated. To update the variance 530, the variance delay loop projects from response 506 to first variance delay 532, from first variance delay 532 to second variance delay 534, from second variance delay 534 to third variance delay 536, and finally from third variance delay 536 to variance 530.

In addition, in a step 610, learning is modulated based on the rate of the received data to learn a consistent response. Specifically, referring to FIG. 5, response delay 540 positively projects to response change 542 and response 506 negatively projects to response change 542. Response change 542 determines the difference between the current response and the previous response. Response change 542 projects to c-group 516 in order to control learning.

In BBD 500, learning occurs through adjusting the activities of the mean 522 and the variance 530 of each cluster 560. Initially, values in the mean 522 are set randomly, while values in the variance 530 are initially set to zero. C-group 516 is the control group for learning in BBD 500 as it directly influences value 518 that is the learning modulator. A constant value 518 is projected from a constant input that keeps learning off in normal condition for all the cluster microcircuits, such as cluster microcircuit 560. The input group 504 has a negative connection to the c-group 516, which allows learning when there is activity present in the data 502. K-out 514 also projects to c-group 516 and only allows learning to occur on the microcircuit where the k-response 512 is the minimal k-response among all the microcircuit groups.

VI. Conclusion

Described above are neural networks for clustering input data based on a Gaussian Mixture Model, and applications thereof. It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A computer-implemented method for clustering a set of input data in a first cluster and a second cluster, wherein the input data includes a first input pattern, comprising:

providing the first input pattern to individual ones of a plurality of cluster microcircuits of a neural network, wherein the plurality of cluster microcircuits includes a first circuit and a second circuit, the first circuit including a first set of response-determining neurons, a first mean vector that encodes a center of the first cluster, and a first co-variance matrix, and the second circuit including a second set of response-determining neurons, a second mean vector that encodes a center of the second cluster, and a second co-variance matrix;

determining a first response of the first circuit with respect to the first input pattern, wherein the first response is based on the first set of response-determining neurons;

calculating a first difference between the first response and the first mean vector;

determining a second response of the second circuit with respect to the first input pattern, wherein the second response is based on the second set of response-determining neurons;

calculating a second difference between the second response and the second mean vector;

determining a smallest difference between the first difference and the second difference; and modifying, responsive to the first difference being the smallest difference, the first mean vector and the first co-variance matrix based on the first response, or, responsive to the second difference being the smallest difference, modifying the second mean vector and the second co-variance matrix based on the second response.

2. The computer-implemented method of claim 1, wherein the input data is K-dimensional, K being an integer greater than one, wherein the first difference is based on a K-dimensional distance between the first response and the first mean vector.

3. The computer-implemented method of claim 1, wherein modification of the first co-variance matrix is based on a first user-specified learning rate, and wherein modification of the second co-variance matrix is based on a second user-specified learning rate.

4. The computer-implemented method of claim 3, wherein the first user-specified learning rate is different from the second user-specified learning rate.

5. The computer-implemented method of claim 1, wherein modification of the first mean vector and the first co-variance matrix is based on a first learning rate, wherein modification of the second mean vector and the second co-variance matrix is based on a second learning rate, wherein, responsive to the first difference being the smallest difference, the first learning rate is greater than the second learning rate, and wherein, responsive to the second difference being the smallest difference, the second learning rate is greater than the first learning rate.

6. The computer-implemented method of claim 5, wherein the first learning rate is based on the first response, and wherein the second learning rate is based on the second response.

7. The computer-implemented method of claim 1, wherein the set of input data includes multiple input patterns, wherein operations are performed for individual ones of the set of multiple input patterns, wherein, responsive to performance of the operations for individual ones of the set of multiple input patterns, the set of input data is clustered such that individual input patterns of the set of input data have a first probability indicating association with the first cluster and a second probability indicating association with the second cluster.

8. The computer-implemented method of claim 7, wherein the set of input data includes an audio signal, wherein the first circuit is configured to distinguish when a particular speaker is talking, and wherein the second circuit is configured to distinguish when a particular language is being spoken.

9. A computer-program product comprising a non-transitory computer-readable storage medium having instructions stored thereon that, if executed by a computing device, cause the computing device to perform a method for clustering a set of input data in a first cluster and a second cluster, wherein the input data includes a first input pattern, the method comprising:

providing the first input pattern to individual ones of a plurality of cluster microcircuits of a neural network, wherein the plurality of cluster microcircuits includes a first circuit and a second circuit, the first circuit including a first set of response-determining neurons, a first mean vector that encodes a center of the first cluster, and a first co-variance matrix, and the second circuit including a second set of response-determining neurons, a second mean vector that encodes a center of the second cluster, and a second co-variance matrix;

determining a first response of the first circuit with respect to the first input pattern, wherein the first response is based on the first set of response-determining neurons;

calculating a first difference between the first response and the first mean vector;

determining a second response of the second circuit with respect to the first input pattern, wherein the second response is based on the second set of response-determining neurons;

calculating a second difference between the second response and the second mean vector;

determining a smallest difference between the first difference and the second difference; and modifying, responsive to the first difference being the smallest difference, the first mean vector and the first co-variance matrix based on the first response, or, responsive to the second difference being the smallest difference, modifying the second mean vector and the second co-variance matrix based on the second response.

10. The computer-program product of claim 9, wherein the input data is K-dimensional, K being an integer greater than one, wherein the first difference is based on a K-dimensional distance between the first response and the first mean vector.

11. The computer-program product of claim 9, wherein modification of the first co-variance matrix is based on a first user-specified learning rate, and wherein modification of the second co-variance matrix is based on a second user-specified learning rate.

12. The computer-program product of claim 11, wherein the first user-specified learning rate is different from the second user-specified learning rate.

13. The computer-program product of claim 9, wherein modification of the first mean vector and the first co-variance matrix is based on a first learning rate, wherein modification of the second mean vector and the second co-variance matrix is based on a second learning rate, wherein, responsive to the first difference being the smallest difference, the first learning rate is greater than the second learning rate, and wherein, responsive to the second difference being the smallest difference, the second learning rate is greater than the first learning rate.

14. The computer-program product of claim 13, wherein the first learning rate is based on the first response, and wherein the second learning rate is based on the second response.

15. A computing system for implementing a neural network for clustering a set of input data in a first cluster and a second cluster, comprising:

an input neural group configured to receive a set of input data, wherein the set of input data includes a first input pattern;

a plurality of cluster microcircuits of the neural network, wherein the plurality of cluster microcircuits includes a first circuit and a second circuit, the first circuit including:
a first set of response-determining neurons configured to determine a first response with respect to the first input pattern,
a first mean vector that encodes a center of the first cluster,
a first co-variance matrix, and
a first neural modification group, the second circuit including:
a second set of response-determining neurons configured to determine a second response with respect to the first input pattern,
a second mean vector that encodes a center of the second cluster,
a second co-variance matrix, and
a second neural modification group, wherein the first circuit is configured to calculate a first difference between the first response and the first mean vector, wherein the second circuit is configured to calculate a second difference between the second response and the second mean vector; and a neural group configured to determine the smallest difference between the first difference and the second difference, wherein, responsive to the first difference being the smallest difference, the first neural modification group is configured to modify the first mean vector and the first co-variance matrix based on the first response, and wherein, responsive to the second difference being the smallest difference, the second neural modification group is configured to modify the second mean vector and the second co-variance matrix based on the second response.

16. The computing system of claim 15, wherein the input data is K-dimensional, K being an integer greater than one, wherein the first difference is based on a K-dimensional distance between the first response and the first mean vector.

17. The computing system of claim 15, wherein the first neural modification group is configured to modify the first co-variance matrix based on a first user-specified learning rate, and wherein the second neural modification group is configured to modify the second co-variance matrix based on a second user-specified learning rate.

18. The computing system of claim 17, wherein the first user-specified learning rate is different from the second user-specified learning rate.

19. The computing system of claim 15, wherein the first neural modification group is configured to modify the first mean vector and the first co-variance matrix based on a first learning rate, wherein the second neural modification group is configured to modify the second mean vector and the second co-variance matrix based on a second learning rate, wherein, responsive to the first difference being the smallest difference, the first learning rate is greater than the second learning rate, and wherein, responsive to the second difference being the smallest difference, the second learning rate is greater than the first learning rate.

20. The computing system of claim 19, wherein the first learning rate is based on the first response, and wherein the second learning rate is based on the second response.

* * * * *